SEMICONDUCTIVE SCANNING DEVICE

Filed May 16, 1960

INVENTOR
C. G. DAVIS
BY R. B. Ardis
ATTORNEY

INVENTOR
C. G. DAVIS
BY R. B. Ardis
ATTORNEY

United States Patent Office
3,010,029
Patented Nov. 21, 1961

3,010,029
SEMICONDUCTIVE SCANNING DEVICE

Claude G. Davis, Morristown, N.J., assignor to Bell Telephone Laboratories, Incorporated, New York, N.Y., a corporation of New York Filed May 16, 1960, Ser. No. 29,453
8 Claims. (Cl. 307—88.5)

This invention relates to scanning circuitry and more particularly to scanning circuitry employing semi-conductive devices which transfer operation from one electrode to another in response to the application of suitable pulses of energy.

The time division multiplexing of input signals, appearing on a large number of channels, to a single channel is usually done prior to encoding in pulse code modulation systems. In the past the circuitry for performing this operation has required a large number of components. One way of multiplexing the signals appearing on a number of channels has been to connect each channel to a gate circuit and to impress a rectangular gating pulse on the control circuit of the gate circuit so that the channel input signal may be transmitted during the gating pulse. The gate circuitry employed in the prior art may make use of two diodes or triode tubes, a pulse transformer, and related circuitry, or some form of diode bridge network, but whatever circuitry is employed each input channel requires the duplication of the circuitry. In addition, the operation must be governed by the application to each gate circuit of a so-called digit pulse during the proper time slot. Where it is required to multiplex the signals appearing on $n$ input channels, $n$ digit pulses sequentially appearing on $n$ separate input lines during the proper one of $n$ time slots of the multiplexing cycle are required. Each of the $n$ pulses is present at the input to its respective gate only during one of the $n$ time slots of the multiplexing cycle; during the remainder of the multiplexing cycle there is no input to its respective gate.

This type of operation therefore required $n$ distinct pulse input lines to $n$ gate circuits, one for each input channel to be multiplexed, although each pulse input line carried only one digit pulse, in a unique time slot, during each multiplexing cycle of $n$ time slots. To supple $n$ digit pulses over $n$ pulse input lines required relatively complex and expensive digit pulse generators.

Therefore, an object of this invention is to simplify the apparatus required for the multiplexing and demultiplexing of signals.

Another object of the invention is to eliminate the need for a digit pulse generator in multiplexing apparatus.

A related object of the invention is to reduce the over-all complexity and cost of multiplexing and demultiplexing apparatus.

In accordance with a principal feature of this invention input signals which are to be multiplexed are applied to every second section of the stepping transistor described in United States Patent 2,856,544 issued to I. M. Ross on October 14, 1958, with the intermediate sections connected to a common control signal. The stepping transistor is a four zone semiconductive device divided into sections which can be placed successively into conduction. The control signal (which must be greater in magnitude than any of the input signals to be multiplexed) turns the sections "on" one after the other, with each input control pulse resulting in two transfers of conduction. The signal appearing at the large area electrode connected to the first zone of the stepping transistor represents the input signals in time division multiplexed form.

The invention will be more fully understood from the following detailed description taken in conjunction with the drawings, in which.

Figure 1:
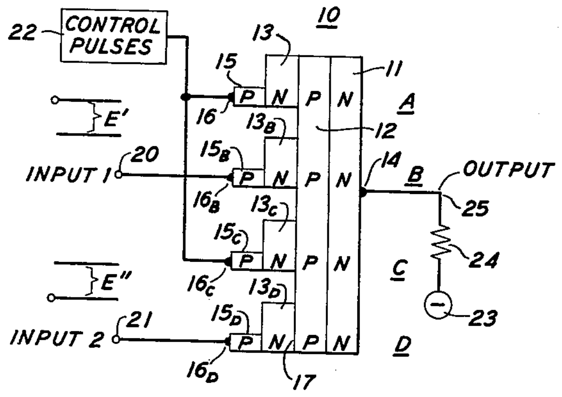
FIG. 1 is a scanner empodying the invention.

A semiconductive device 10 functioning as a four zone stepping transistor is shown in FIG. 1. This stepping transistor includes sections A, B, C, D which can be placed successively in conduction and is disclosed in the above-mentioned Ross patent. The structure described therein comprises a semiconductive wafer, preferably of diffused silicon, having first 11 and second 12 zones of opposite conductivity type and an aligned array of third zones 13 on the second zone 12 of a conductivity type opposite that of the second zone 12. A large area electrode 14 is provided on the first zone 11 to provide a common terminal for each section of the stepping device. A fourth zone 15 individual to each of said third zones 13 and of a conductivity type opposite that of the third zone 13 is connected to a second electrode 16 to provide the only other connections to the structure. Positive stepping action is insured by forming the tihird zones 13 with substantial lateral resistance and the fourth zone 15 is positioned on the third zone 13 at one end so that it is adjacent a portion of the next succeeding section A, B, C, D in the device which is to be operated. In operation each section A, B, C, D offers a bistable characteristic which is attributable to a change in the current multiplication in one or both of the intermediate zones 12, 13 as a function of current through the section. Each section offers a high impedance at low current and low current multiplication, and low impedance at high current and high current multiplication. An explanation of this phenomenon is that the intermediate zones 12 and 13 contain charge carrier recombination centers which are unoccupied at low currents and can be at least partially occupied at high current. Below some critical density of charge carriers in these zones, a major portion of the charge carriers entering the zones lodge in the centers and fail to traverse the zone to the rectifying junction 17 which is reverse biased by a biasing voltage applied to electrode 14. In view of the absence of charge carriers to modify the impedance of the junction, the element exhibits its reverse impedance and passes approximately the saturation current of the junction until a potential exceeding the breakdown potential is impressed across it. At high charge densities in the intermediate zones of the device, a greater portion of the recombination centers is occupied and a large proportion of any injected charge is collected at the reverse biased junction. The configuration of the third and fourth zones 13, 15 and their arrangement on the second zone 12 enables the increased charge carrier density in the third zone 13, attributable to low impedance operation of the section A, B, C or D including that zone, to extend into the third zone of the next succeeding section of the semiconductive device whereby the removal of the sustaining energy from the first zone of a section and the application of sustaining energy to the first zone of the next succeeding section enables the next succeeding section to be triggered into its low impedance condition. The lateral resistance of the third zone of the next section causes this low impedance operation to be shifted so that the density of charge carriers is concentrated under the electrode of the third section by the second section, thereby priming the third section for operation when the cycle is repeated.

The stepping transistor 10 is connected with every second section B, D having its first zone $15_B$ and $15_D$ connected to a respective input channel 20, 21 carrying signals which are to be multiplexed. Intermediate sections A, C have their respective fourth zones $15_A$ and $15_C$ connected in common to a source 22 of control pulses. The stepping transistor shown is of the type wherein the first zone 11 is of n type material, the second zone 12 is of p type material, the third zone 13 of n type, the fourth zone 15 of p type semiconductive material, and the biasing voltage 23 applied to the first zone 11 through resistor 24 is negative. The stepping transistor could, of course, be such that all the material types are of the opposite conductivity type from those shown in the drawings, with the necessity of changing the polarity of the biasing voltage 23.

The operation of the scanner shown in FIG. 1 can be best explained in the following manner. Assume that the first section A of the stepping transistor 10 is in a low impedance state due to the presence of a positive control pulse at the input terminal 16 of the first section. Because the first section A is broken down, a positive voltage corresponding to the maximum positive excursion E of the control pulse appears at output terminal 25, and in addition section B is placed in a low impedance state. When the control pulse becomes negative the first section A of the stepping transistor is back biased and no longer conducts, and section B now conducts any signal, E′, appearing at terminal 20, placing section C in a low impedance state. When the control pulse becomes positive again section C conducts, driving point 25 to a positive value corresponding to the maximum positive value corresponding to the maximum positive excursion E of the control pulse and section B is back biased since the positive excursion of the control pulse is more positive than any possible input signal. Section D has been placed in the low impedance condition, so that when the control pulse becomes negative and section C is back biased, section D will conduct any signal, E″, appearing at its input terminal $16_D$.

Figure 2:
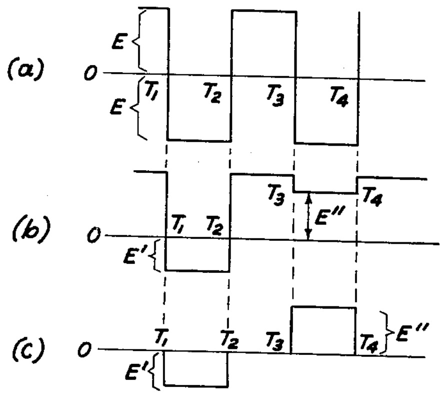
FIG. 2 shows: in line ($a$) the control pulses which transfer conduction from section to section in the stepping transistor, in line ($b$) the potential which appears at the large area electrode connected to the first zone of the device, and in line ($c$) the output of the multiplexer of FIG. 3.
Figure 3:
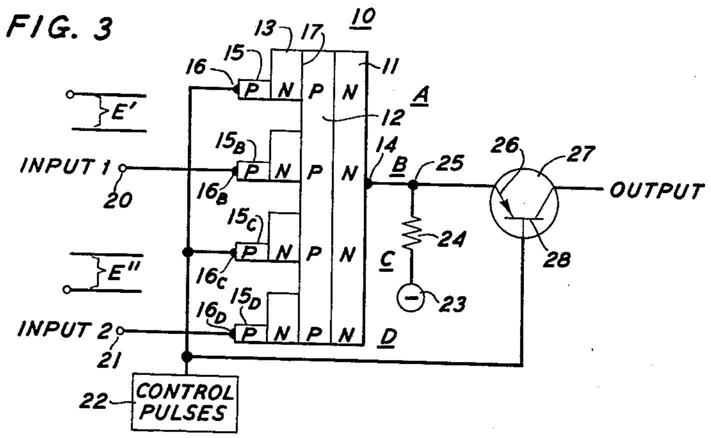
FIG. 3 shows a multiplexer embodying the invention.

The resulting output from the above-described operation appearing at output terminal 25 is shown in line (*b*) of FIG. 2 with the control signal shown in line (*a*) of FIG. 2. E′ is the signal which appeared at terminal 20 during the time interval during which section B conducted, E″ is the signal which appeared at terminal 21 during the time interval that section D conducted, and E is the magnitude of the positive or negative excursions of the control pulse. It is immediately evident from an examination of line (*b*) of FIG. 2 that it is necessary to remove the control signal from the output appearing at terminal 25 if the signal at that point is to represent the multiplexing of the input voltages applied to every second section of the semiconductive device. The control pulses are easily removed from the signal appearing at point 25 by connecting terminal 25 to the emitter 26 of a P-N-P transistor switch 27 and connecting the base 28 of the transistor switch 27 to the source of control pulses 22. The resulting circuit is shown in FIG. 3 and the appearance of a positive control pulse at the base of the transistor causes the transistor switch to open so that no signal is transmitted through the transistor switch during the presence of a positive control pulse. The resulting output at the collector of the transistor switch is shown in line (*c*) of FIG. 2 and is a signal representative of the time division multiplexing of the input signals to the semiconductive device. The complete circuitry shown in FIG. 3 is known in the art as a multiplexer which also performs the function of sampling the input signals.

By reversing the multiplexing process shown in FIG. 3 it is possible to demultiplex a given input singal. That is, by applying an already multiplexed signal to the large electrode 14 of the stepping transistor 10, connecting the control pulse source 22 to the terminals $16_A$ and $16_C$, connecting terminals $16_B$ and $16_D$ to a source of positive voltage 30 through resistors 31 and 32, the signals appearing at the terminals $16_B$ and $16_D$ of the sections connected to the source of positive voltage will be the input signal in demultiplexed form.

Figure 4:
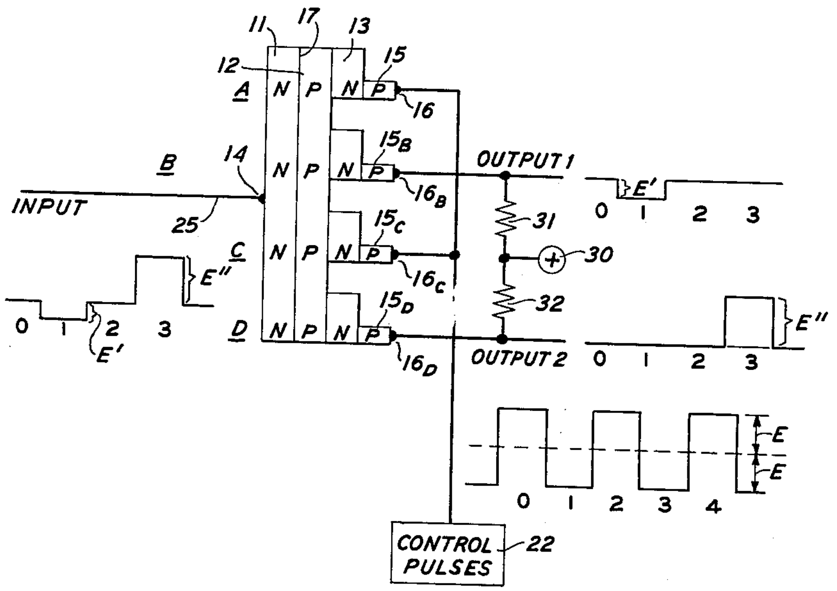
FIG. 4 shows a demultiplexer embodying the invention.

The resulting circuitry is shown in FIG. 4. Control pulse source 22 is synchronized with the signal to be demultiplexed so that the control pulse is positive only during the time interval that no signal to be demultiplexed appears at the input terminal 25 to the stepping transistor 10. The input signal at terminal 25 in FIG. 4 is a signal to be demultiplexed during the "1," "3," "5," . . . time intervals as indicated by the waveform shown to the left in FIG. 4. During the time intervals designated "0," "2," "4," . . . there is no signal to be demultiplexed and the control pulse is positive. Assume that during the time interval designated "0" section A is broken down due to the control pulse, which results in the second section B being in a low impedance state. During the time interval designated "1" when the control pulse is negative and the second section B of the device conducts the input signal applied to terminal 25 since the voltage applied to the fourth zone $15_B$ by source 30 through resistor 31 is always greater in positive magnitude than any positive input signal. Section A is back biased during the interval designated "1" since the control pulse is negative. As a result of second section B conducting, the third section C is placed in a low impedance condition, so that during the time interval designated "2" the third section C conducts as a result of the positive control pulse applied to its terminal $16_C$, and in addition the fourth section D is placed in a low impedance condition. During the third time interval the negative control pulse back biases the third section C and the fourth section D biased by source 30 through resistor 32 now conducts the input signal applied to terminal 25. This process results in the demultiplexed signals appearing at the output terminals connected to terminals $16_B$ and $16_D$ of the semiconductive device as shown by the waveforms to the right of the output terminals of FIG. 4.

Figure 5:
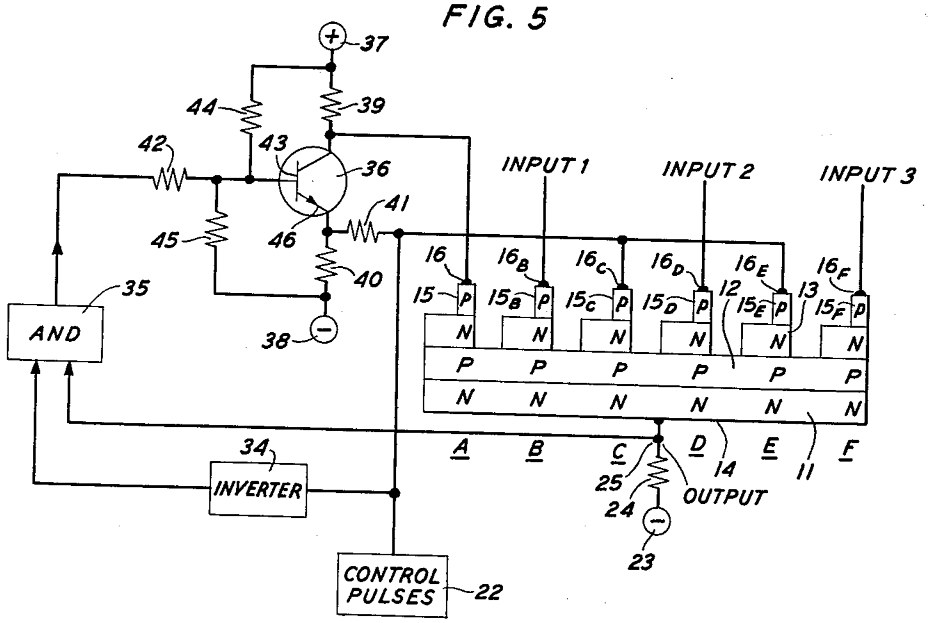
FIG. 5 shows the multiplexer of FIG. 3 with provision for recycling.

FIG. 5 illustrates the associated circuitry necessary for insuring that the multiplexing circuit of FIG. 3 is properly recycled. Once the conducting sections have advanced to the end of the stepping transistor it is necessary that the first section again break down to repeat the multiplexing cycle. The stepping transistor could of course be a closed array of stepping sections, as disclosed in the above-mentioned Ross patent, which loop back on themselves, in which case recycling would be automatic. If an open ended stepping transistor such as shown in FIG. 1 is used, however, some method of recycling is necessary regardless of the number of sections in the device and such circuitry is illustrated in FIG. 5. Control pulses inverted by inverter 34 are applied to an AND gate 35 and the voltage appearing at the output terminal 25 is also applied as an input to that AND gate. A N-P-N transistor 36 is biased by positive collector voltage 37 and negative emitter voltage 38 through resistors 39 and 40 respectively so that the transistor 36 is conducting in the absence of a negative input voltage applied to its base of sufficient magnitude to cut it off. The control voltage source is connected by means of a voltage divider consisting of resistors 40 and 41 to the emitter 46 of the transistor 36, and the AND gate 35 is connected by means of resistor 42 to the base 43 of the transistor 36. The positive collector voltage 37 is connected to the base 43 of the transistor 36 by means of resistor 44, and the base 43 is also connected to the source of negative voltage 38 by means of resistor 45. The bias voltages and the voltage dividers are so chosen that when the control pulse is positive and no section of the semiconductive device is conducting, the emitter voltage of the transistor is higher than the voltage at terminal 25 and the transistor turns off, putting a high positive voltage from source 37 on the input terminal 16 of the first section A of the semiconductive stepping device to break down that first section A. Since the only time that the control pulse is positive and the voltage at terminal 25 is less than the emitter voltage of the transistor is when the open ended stepping transistor has reached the end section E of the available number of conducting sections this circuitry achieves cycling.

It is to be understood that the above-described embodiments are illustrative of the application of the principles of the invention. Numerous other arrangements may be devised by those skilled in the art without departing from the spirit and scope of the invention.

What is claimed is:

1. A scanning circuit which comprises, in combination, a stepping transistor in the form of a semiconductive body containing four contiguous zones of alternate conductivity type and a plurality of conducting paths each extending transversely through all four of said zones, the first two of said zones being common to all of said conducting paths and the final two being divided into individual spaced portions forming a predetermined array, separate signal paths connected to alternate ones of said conducting paths at the ends formed by said separate spaced semiconductive body portions, a common signal path connected to all of said conducting paths at the ends formed by said common semiconductive body portion, and means to transfer conductivity from one to the next succeeding one of said conducting paths which comprises means to supply control pulses to each of the intervening conducting paths at the ends formed by said separate spaced portions to forward and reverse bias the said intervening conducting paths in alternation.

2. A scanning circuit comprising, in combination, a semiconductive body having an array of individual conducting paths within said body, a first zone in said body of a first conductivity type, a second zone contiguous with said first zone and of a second conductivity type opposite that of said first zone, said first and second zones being common to each of said individual conducting paths, a plurality of third zones contiguous with said second zone and of said first conductivity type, a plurality of fourth zones of said second conductivity type, one of said fourth zones being contiguous with and individual to each of said third zones, each of said third and fourth zones being individual to one of said conducting paths, an output terminal connected to said first zone, a source of input signals to be scanned connected to every second fourth zone, and a source of control signals connected to each of the fourth zones intermediate to said fourth zones to which said input signals are connected to transfer conduction from one conducting path to its adjoining conducting path in a predetermined direction.

3. A scanning circuit comprising, in combination, a semiconductive body having an array of individual conducting paths within said body, a first zone in said body of a first conductivity type, a second zone contiguous with said first zone and of a second conductivity type opposite that of said first zone, said first and second zones being common to each of said individual conducting paths, a plurality of third zones contiguous with said second zone and of said first conductivity type, a plurality of fourth zones of said second conductivity type, one of said fourth zones being contiguous with and individual to each of said third zones, each of said third and fourth zones being individual to one of said conducting paths, a source of input signals to be scanned connected to said first zone, an output terminal connected to every second fourth zone, a source of control pulses connected to each of the intermediate fourth zones to transfer conduction from one conducting path to its adjoining conducting path in a predetermined direction.

4. A multiplexer which comprises, in combination, a stepping transistor in the form of a semiconductive body containing four contiguous zones of alternate conductivity type and a plurality of conducting paths each extending transversely through all four of said zones, the first two of said zones being common to all of said conducting paths and the final two being divided into individual spaced portions forming a predetermined array, separate signal input paths connected to alternate ones of said conducting paths at the ends formed by said separate spaced semiconductive body portions, a common signal output path for time division multiplexed samples from said signal input paths connected to all of said conducting paths at the ends formed by said common semiconductive body portion, and means to supply control pulses to each of the intervening conducting paths at the ends formed by said separate spaced portions to forward and reverse bias the said intervening conducting paths in alternation.

5. A multiplexing circuit comprising, in combination, a semiconductive body having an array of individual conducting paths within said body, a first zone in said body of a first conductivity type, a second zone contiguous with said first zone and of a second conductivity type opposite that of said first zone, said first and second zones being common to each of said individual conducting paths, a plurality of third zones contiguous with said second zone and of said first conductivity type, a plurality of fourth zones of said second conductivity type, one of said fourth zones being contiguous with and individual to each of said third zones, each of said third and fourth zones being individual to one of said conducting paths, an output terminal connected to said first zone, input signals to be multiplexed connected to every second fourth zone, a source of control signals connected to each of the intermediate zones between the zones to which said input signals are applied to transfer conduction from one conductivity path to its adjoining conductivity path in a predetermined direction, and gating means connected to said output terminal to eliminate the control signal from the multiplexed signal appearing at said output means.

6. A multiplexer which comprises, in combination, a stepping transistor in the form of a semiconductive body containing four contiguous zones of alternate conductivity type and a plurality of conducting paths each extending transversely through all four of said zones, the first two of said zones being common to all of said conducting paths and the final two being divided into individual spaced portions forming a predetermined array, separate signal input paths connected to alternate ones of said conducting paths at the ends formed by said separate spaced semiconductive body portions, a common signal output path for time division multiplexed samples from said signal input paths connected to all of said conducting paths at the ends formed by said common semiconductive body portion, means to transfer conductivity from one to the next succeeding one of said conducting paths which comprises means to supply control pulses to each of the intervening ones of said conducting paths except a predetermined first conducting path of said intervening conducting paths at the ends formed by said separate spaced portions to forward and reverse bias these said intervening conducting paths in alternation, and means to recycle said stepping transistor when conductivity is transferred to the final conducting path which comprises means to apply a forward bias to a predetermined first conducting path of said intervening conducting paths whenever no conducting path is conductive during the occurrence of a control pulse.

7. A demultiplexer which comprises, in combination, a stepping transistor in the form of a semiconductive body cotnaining four contiguous zones of alternate conductivity type and a plurality of conducting paths each extending transversely through all four of said zones, the first two of said zones being common to all of said conducting paths and the final two being divided into individual spaced portions in a predetermined array, a signal input path carrying time division multiplexed pulses connected to all of said conducting paths at the ends formed by said common semiconductive body portion, separate output paths for demultiplexed pulses from said signal input path connected to alternate ones of said conducting paths at the ends formed by said separate spaced semiconductive body portions, and means to supply control pulses to each of the intervening ones of said conducting paths at the ends formed by said separate spaced portions to forward and reverse bias the said intervening conducting paths in alternation.

8. A demultiplexer device comprising, in combination, a semiconductive body having an array of individual conducting paths within said body, a first zone in said body of a first conductivity type, a second zone contiguous with said first zone and of a second conductivity type opposite that of said first zone, said first and second zones being common to each of said individual conducting paths, a plurality of third zones contiguous with said second zone and of said first conductivity type, a plurality of fourth zones of said second conductivity type, one of said fourth zones being contiguous with and individual to each of said third zones, each of said third and fourth zones being individual to one of said conducting paths, a source of input signals to be demultiplexed connected to said first zone, means to apply biasing voltages to every second fourth zone, a source of control signals connected to every fourth zone intermediate to said fourth zones to which said biasing voltages are applied to transfer conduction from one conducting path to its adjoining conducting path in a predetermined direction.

References Cited in the file of this patent

UNITED STATES PATENTS

| | | |
|---|---|---|
| 2,856,544 | Ross | Oct. 14, 1958 |
| 2,967,952 | Shockley | Jan. 10, 1961 |